(12) United States Patent
Newhouse

(10) Patent No.: US 9,706,833 B2
(45) Date of Patent: Jul. 18, 2017

(54) DESKTOP RECEPTACLE WITH RIGID SUPPORT

(71) Applicant: Group Dekko, Inc., Garrett, IN (US)

(72) Inventor: Thomas J. Newhouse, Grand Rapids, MI (US)

(73) Assignee: Group Dekko, Inc., Garrett, IN (US)

( * ) Notice: Subject to any disclaimer, the term of this patent is extended or adjusted under 35 U.S.C. 154(b) by 0 days.

(21) Appl. No.: 14/959,610

(22) Filed: Dec. 4, 2015

(65) Prior Publication Data
US 2017/0156490 A1 Jun. 8, 2017

(51) Int. Cl.
| | | |
|---|---|---|
| *A47B 37/00* | (2006.01) | |
| *A47B 21/06* | (2006.01) | |
| *H01R 13/73* | (2006.01) | |
| *H01R 25/00* | (2006.01) | |

(52) U.S. Cl.
CPC ............ *A47B 21/06* (2013.01); *H01R 13/73* (2013.01); *H01R 25/006* (2013.01); *A47B 2021/066* (2013.01)

(58) Field of Classification Search
CPC ...................................................... A47B 21/00
USPC .................................... 108/50.02; 312/223.3
See application file for complete search history.

(56) References Cited

U.S. PATENT DOCUMENTS

| | | | | | |
|---|---|---|---|---|---|
| 4,984,982 A | * | 1/1991 | Brownlie | ............. | G02B 6/4451 174/490 |
| 5,008,491 A | * | 4/1991 | Bowman | ................ | H02G 3/185 174/489 |
| 5,230,552 A | * | 7/1993 | Schipper | ................ | A47B 21/06 108/26 |
| D353,363 S | * | 12/1994 | Toby | .......................... | D13/139.4 |
| 5,575,668 A | * | 11/1996 | Timmerman | .......... | A47B 21/06 174/482 |
| 5,709,156 A | * | 1/1998 | Gevaert | ................. | A47B 21/06 108/26 |
| 5,755,582 A | * | 5/1998 | Charlton | ................ | H02G 3/185 292/219 |
| 5,980,279 A | * | 11/1999 | Muller | ................... | A47B 21/06 174/489 |
| 6,046,405 A | * | 4/2000 | Obermann | ............. | H02G 3/185 174/17 CT |
| 6,979,209 B2 | * | 12/2005 | Griepentrog | ......... | H01R 13/447 174/57 |
| 7,407,392 B2 | * | 8/2008 | Cooke | .................... | A47B 21/06 108/62 |
| D639,244 S | * | 6/2011 | Byrne | ........................ | D13/139.4 |
| 8,287,292 B2 | * | 10/2012 | Byrne | .................... | H02G 3/185 439/131 |
| 8,690,590 B2 | * | 4/2014 | Byrne | ...................... | H05K 5/03 439/131 |
| 8,944,266 B2 | * | 2/2015 | Roemer | ................. | H02G 3/185 174/76 |
| D753,609 S | * | 4/2016 | Wetzel | .......................... | D10/49 |

(Continued)

*Primary Examiner* — Jose V Chen
(74) *Attorney, Agent, or Firm* — Taylor IP, P.C.

(57) ABSTRACT

A desktop receptacle includes: a housing having a top surface, at least one electrical port formed therein, and defining an enclosed space configured to hold an electrical circuit; and a rigid support having a peripheral portion and an angled portion connected to the peripheral portion and attached to the top surface of the housing, the angled portion forming a holding angle relative to the peripheral portion that is not perpendicular.

20 Claims, 5 Drawing Sheets

(56) References Cited

U.S. PATENT DOCUMENTS

2008/0121147 A1* 5/2008 Cooke .................... A47B 21/06
                                                      108/50.02
2015/0320203 A1* 11/2015 Mandon ................ A47B 21/06
                                                      108/20

* cited by examiner

DESKTOP RECEPTACLE WITH RIGID SUPPORT

BACKGROUND OF THE INVENTION

1. Field of the Invention

The present invention relates to desktop receptacles, and, more particularly, to desktop receptacles with electrical ports.

2. Description of the Related Art

Desktop receptacles are known that can be connected to an electrical or data source, such as a wall outlet or computer, and installed in a work area to allow for electronic devices in the work area to connect to the wall outlet or computer. For aesthetic purposes, many installed desktop receptacle are hidden from sight. This can be accomplished by installing the desktop receptacle in an out of sight location of the work area, such as underneath a desk. In such cases, it can be difficult to access the desktop receptacle to connect electronic devices.

Another known way to hide the installed desktop receptacle from sight is to include a mechanism with the desktop receptacle that switches the desktop receptacle between a hidden position, where the electrical connectors of the desktop receptacle are hidden, and an exposed position, where the electrical connectors are exposed. Such constructions, known as "pop-up desktop receptacles," allow a user to decide when the connectors can be accessed and when the connectors are hidden.

One problem with pop-up desktop receptacles is that the mechanisms used to switch the desktop receptacles between the hidden and exposed positions are prone to wear, breakage and tampering. Such concerns are especially prevalent in public places, such as schools, where the receptacles' users may roughly handle the receptacles to switch the receptacles between the hidden and exposed positions, leading to premature breakage of the receptacles' switching mechanism. Children and curious adults are also prone to tampering with the parts of the switching mechanism, which can cause the switching mechanism to malfunction and/or break. When the switching mechanism is broken, the receptacle may be stuck in the hidden position and thus be inaccessible, warranting replacement.

What is needed in the art is an aesthetically pleasing desktop receptacle that is less prone to wear, breakage and tampering.

SUMMARY OF THE INVENTION

The present invention provides a desktop receptacle having a rigid support with a peripheral portion and an angled portion that is attached to a top surface of a housing.

The invention in one form is directed to a desktop receptacle including: a housing having a top surface, at least one electrical port formed therein, and defining an enclosed space configured to hold an electrical circuit; and a rigid support having a peripheral portion and an angled portion connected to the peripheral portion and attached to the top surface of the housing, the angled portion forming a holding angle relative to the peripheral portion that is not perpendicular.

The invention in another form is directed to an article of furniture including: a work surface having an opening formed therein; a rigid support resting on the work surface, the rigid support having a peripheral portion resting on the work surface and an angled portion connected to the peripheral portion, the angled portion forming a holding angle relative to the peripheral portion that is not perpendicular; and a housing at least partially held in the opening and having a top surface and at least one electrical port formed therein, the housing defining an enclosed space configured to hold an electrical circuit, the top surface being attached to the angled portion of the rigid support.

An advantage of the present invention is the angled portion of the rigid support being attached to the top surface of the housing gives the impression that the desktop receptacle is a pop-up desktop receptacle, which consumers find aesthetically pleasing, while being difficult to break.

Another advantage is the desktop receptacle can have a low space requirement since there are no moving parts.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION OF THE INVENTION

Figure 1:
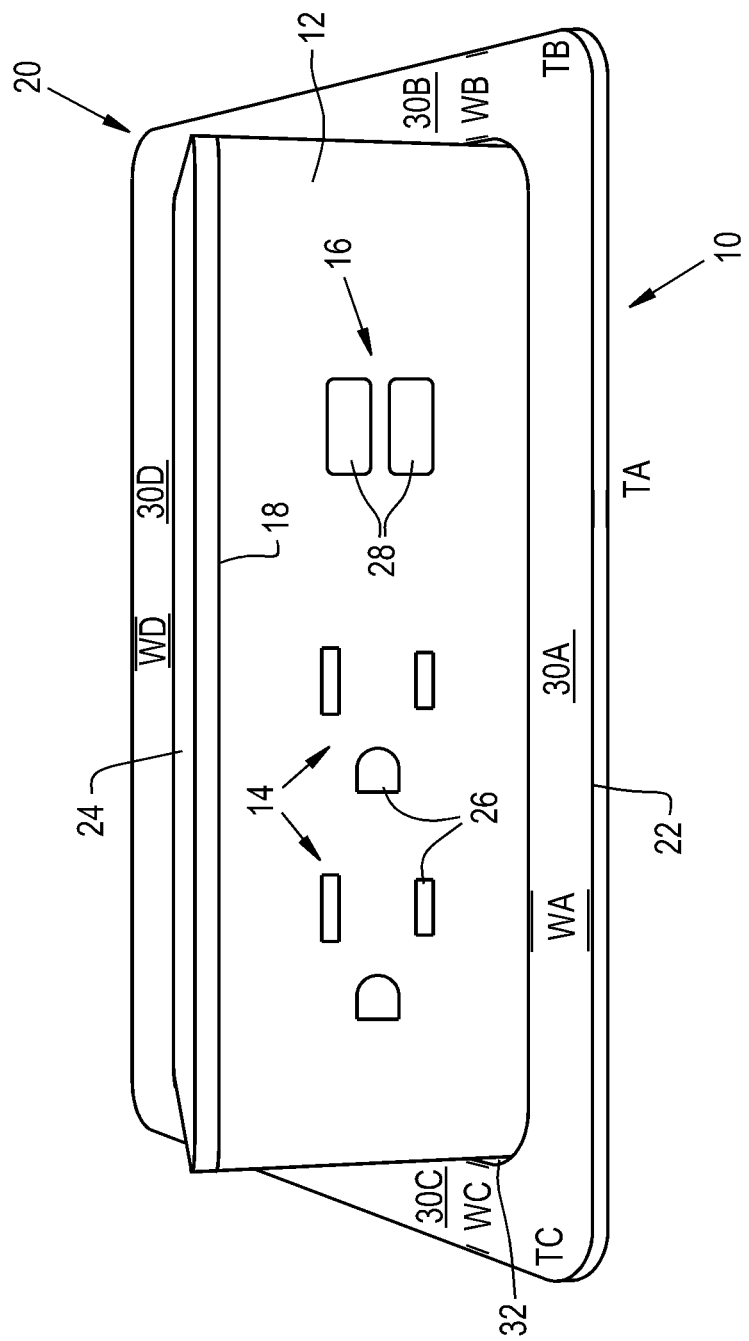
FIG. 1 is a perspective view of an embodiment of a desktop receptacle according to the present invention installed on a surface.
Figure 2:
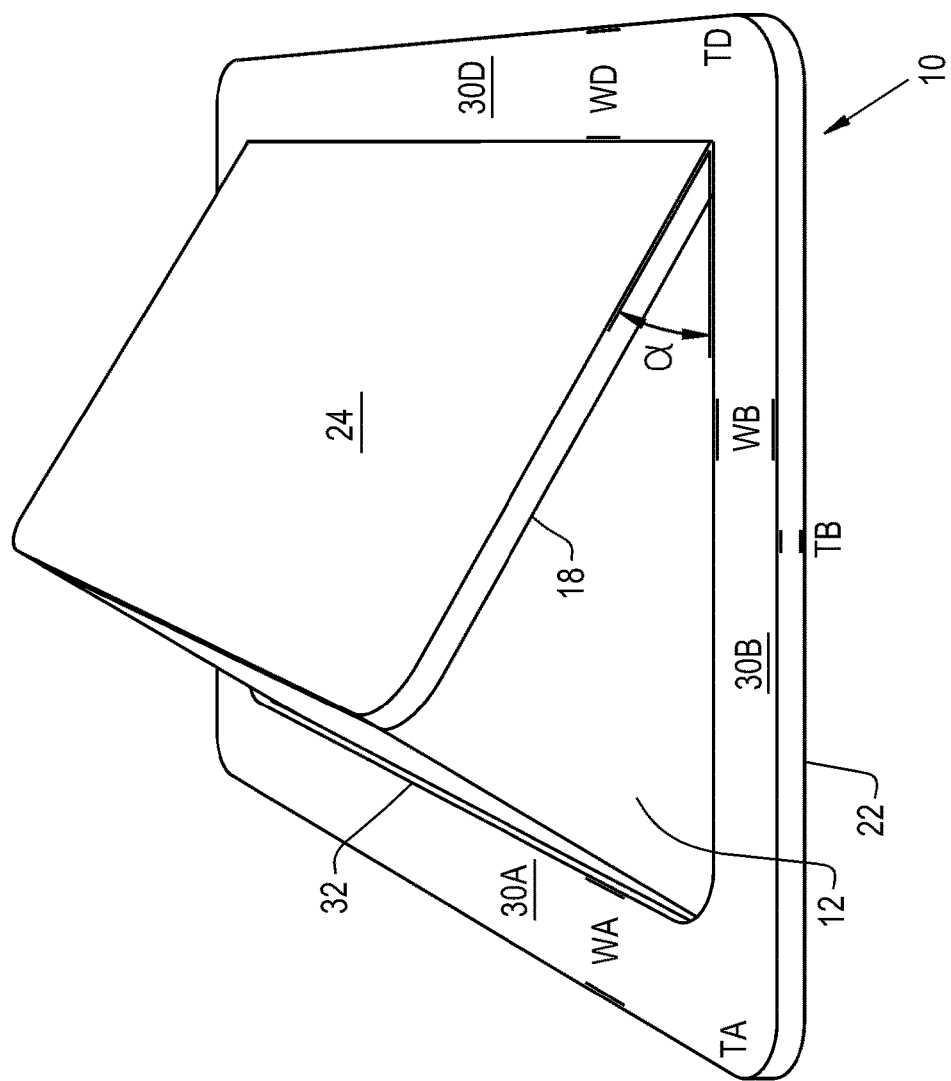
FIG. 2 is a side view of the desktop receptacle shown in FIG. 1.
Figure 3:
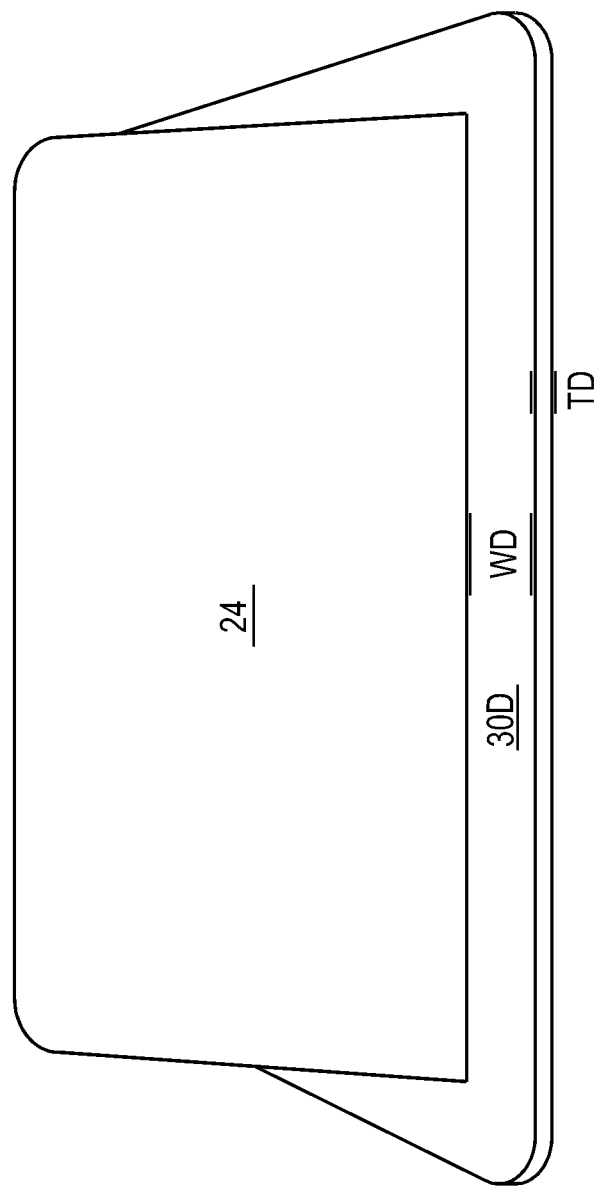
FIG. 3 is a rear perspective view of the desktop receptacle shown in FIGS. 1-2.

Referring now to the drawings, and more particularly to FIGS. 1-3, there is shown a desktop receptacle 10 which generally includes a housing 12 with electrical ports 14, 16 formed in the housing 12 and a top surface 18, and a rigid support 20 having a peripheral portion 22 and an angled portion 24 connected to the peripheral portion 22 and attached to the top surface 18 of the housing 12. The electrical ports 14 and 16, as shown, can allow a device to plug into electrical connectors such as three prong connectors 26 and USB connectors 28, respectively, of an electrical circuit (not seen) inside the housing 12 and connected to a source of power or data, such as a wall outlet. The electrical circuit can thus be any type of circuit construction that allows devices to plug into the circuit and receive power and/or data supplied to the electrical circuit from a power and/or data source, such as the aforementioned wall outlet. The housing 12 can be formed of any suitable material for holding electrical circuits, with polymers and other electrically non-conductive materials being useful to meet various safety standards.

The peripheral portion 22 of the rigid support 20 can have four sides 30A, 30B, 30C, and 30D surrounding an opening 32 formed in the peripheral portion 22. The opening 32 can be formed by the sides 30A, 30B, 30C, and 30D to have dimensions that closely fit the dimensions of the housing 12 so that the housing 12 can be partially held in the opening 32 and have little, if any, space between the sides 30A, 30B, 30C, and 30D of the peripheral portion 22 and the housing 12. The sides 30A, 30B, 30C, and 30D can each have a thickness TA, TB, TC, and TD, respectively, and a width WA, WB, WC, and WD, respectively, that allow the peripheral portion 22 to stably rest on a surface.

The angled portion 24 of the rigid support 20 is connected to the peripheral portion 22 at, for example, one of the sides of the peripheral portion 22, shown as side 30D in FIG. 1. The angled portion 24 can be connected to the peripheral portion 22 in any fashion that allows the angled portion 24 to be rigid and resist bending of the angled portion 24 relative to the peripheral portion 22, such as by welding the angled portion 24 to the peripheral portion 22. The angled portion 24 forms a holding angle α relative to the peripheral portion 22, which can be flat, that is not perpendicular and can be, for example, between 20 and 60 degrees relative to the peripheral portion 22. The angled portion 24 can be formed in the rigid support 20 in a variety of ways. For example, the angled portion 24 can be welded to the side 30D of the peripheral portion 22, as previously described, or formed by bending the angled portion 24 using a manufacturing grade bending machine that can apply far more bending pressure than the average person. It should be appreciated that any suitable technique for forming the angled portion 24 can be utilized and the above given techniques are exemplary only.

As used herein, the support 20 is "rigid" in the sense that the angled portion 24 cannot be easily deformed by an average person to significantly alter the holding angle α. This rigidity can come from the material choice of the rigid support 20 and/or the connection between the peripheral portion 22 and the angled portion 24. The peripheral portion 22 and the angled portion 24 can be formed, for example, from a high strength material such as stainless steel or aluminum having a sufficient thickness to prevent a person having average strength to easily bend the rigid support 20 and change the holding angle α. The material forming the peripheral portion 22 and/or the angled portion 24 can be, for example, stainless steel having a thickness of 0.25 to 0.75 centimeters, which is not easily bent by the average person. Alternatively, the strength of the connection between the peripheral portion 22 and the angled portion 24 can be reinforced to make it difficult to change the holding angle α in order to make the support 20 "rigid."

To attach the top surface 18 of the housing 12 to the angled portion 24, a strong adhesive, such as an epoxy or cyanoacrylate composition, can be used to cover the top surface 18 before pressing the top surface 18 to the angled portion 24 and allowing the adhesive to cure, forming a strong attachment between the top surface 18 and the angled portion 24. When an adhesive is used, it is useful if the angled portion 24 has similar or larger dimensions compared to the top surface 18 so the entire surface area of the top surface 18 can be covered with adhesive and attached to the angled portion 24 to increase the bond strength of the adhesive. It should be appreciated that any suitable way of attaching the top surface 18 to the angled portion 24 can be utilized, such as attaching the top surface 18 to the angled portion 24 using one or more fasteners, and that the described adhesive and fastener(s) are only exemplary ways of attaching the top surface 18 to the angled portion 24. Since the top surface 18 of the housing 12 is attached to the angled portion 24 of the rigid support 20, the top surface 18 of the housing 12 is also angled at approximately the holding angle α relative to the peripheral portion 22 of the rigid support 20. As can be seen in FIGS. 1-2, this gives the appearance that the desktop receptacle 10 is a pop-up desktop receptacle, as many pop-up desktop receptacles hold the housing portions at an angle to enable pivoting of the housing between the exposed and hidden positions. The desktop receptacle 10 according to the present invention, therefore, has the aesthetic look of a pop-up desktop receptacle, which many consumers find to be desirable, with increased durability due to the rigid support 20 and the absence of moving parts.

Figure 4:
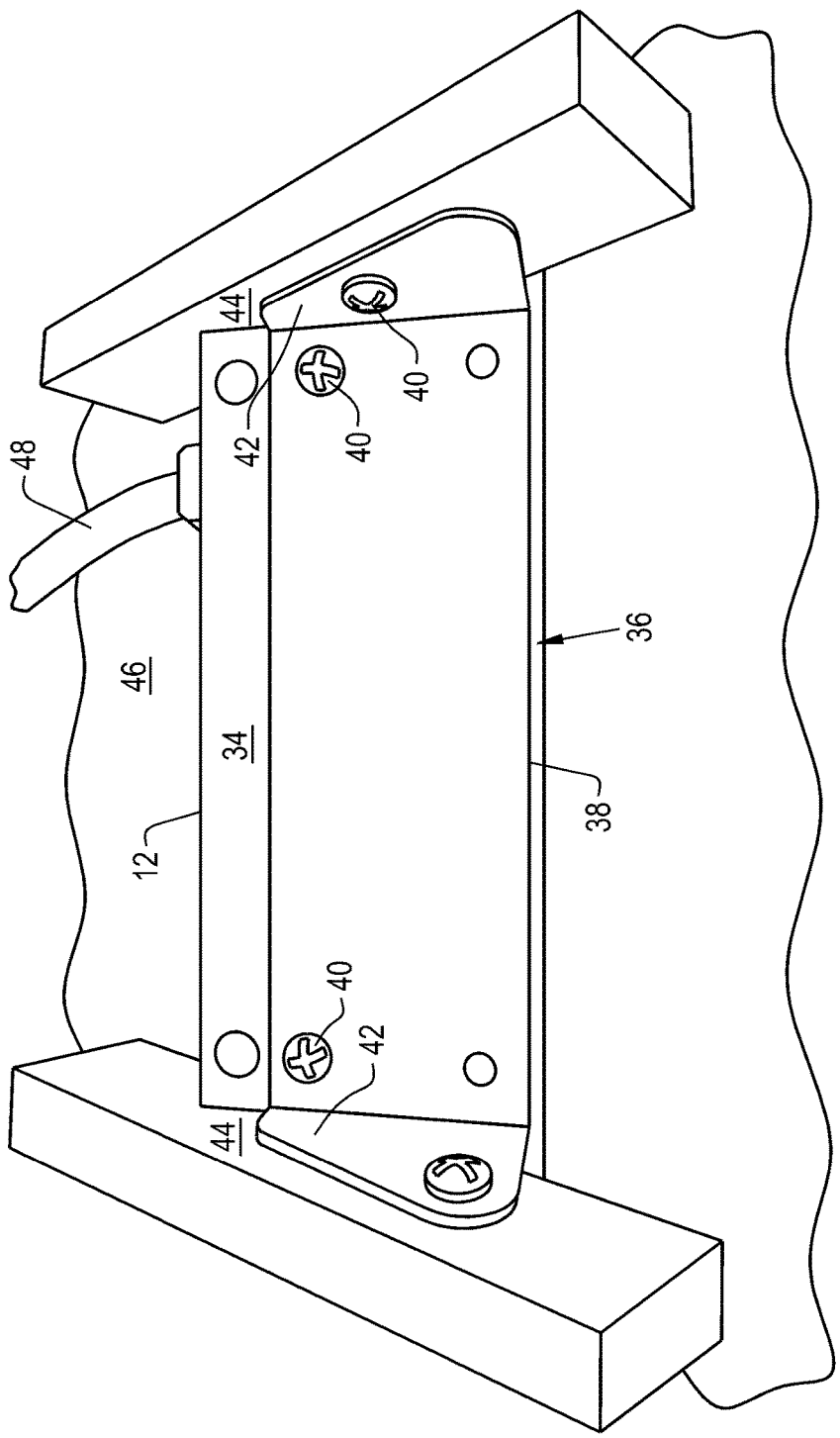
FIG. 4 is a bottom view of the desktop receptacle shown in FIGS. 1-3.

Referring now to FIG. 4, it can be seen that a bottom surface 34 of the housing 12 is attached to a support bracket 36. The support bracket 36 has a main portion 38 that is fastened to the bottom surface 34 of the housing 12 with fasteners 40 and mounting portions 42 that can be fastened to support surfaces 44, shown as being under a bottom 46 of a work surface 102 (shown in FIG. 5). The support bracket 36 can be attached to the bottom surface 34 of the housing 12 but not the rigid support 20, so that the support bracket 36 offers supplementary support to the housing 12 being forced through the opening 32 formed in the rigid support 20. The support bracket 36 can therefore have any shape suitable for mounting to a support surface to support the bottom surface 34 of the housing 12 and help stabilize the mounting of the desktop receptacle 10 in a work surface. As can also be seen in FIG. 4, a power cord 48 connected to the electrical circuit inside the housing 12 extends out of the housing 12 and can be connected to a wall outlet or other device to provide electrical power to the electrical circuit in the housing 12 and any devices connected to the electrical circuit through the connectors 26 and 28.

Figure 5:
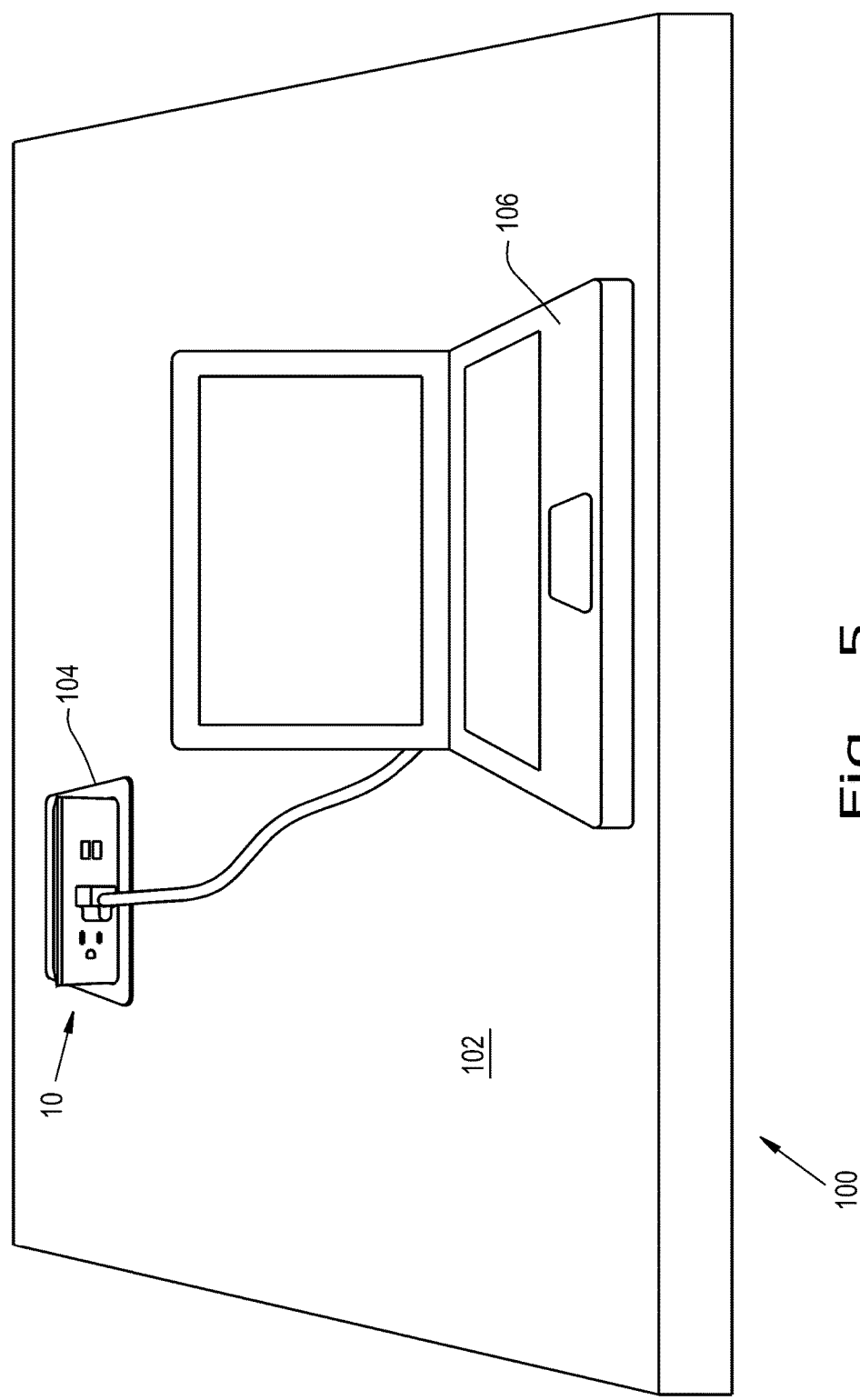
FIG. 5 is a perspective view of an embodiment of an article of furniture according to the present invention with the desktop receptacle shown in FIGS. 1-4 installed in the article of furniture.

Referring now to FIG. 5, an embodiment of an article of furniture 100 incorporating the desktop receptacle 10 shown in FIGS. 1-4 is shown. The article of furniture 100 can be, for example, a conference room table with one or more desktop receptacles 10 provided to allow users to plug electronic devices into electrical power and/or data sources. As can be seen, the article of furniture 100 has a work surface 102 that the peripheral portion 22 of the rigid support 20 rests on to support the rigid mount 20 on the work surface 102. If desired, the peripheral portion 22 can be attached to the work surface 102 using an adhesive, fastener, or any other element that can firmly adhere the peripheral portion 22 to the work surface 102. The work surface 102 has an opening 104 formed therein and the housing 12 of the desktop receptacle 10 is at least partially held within the opening 104 so the bottom surface 46 of the housing 12 is underneath the work surface 102. The electrical circuit inside the housing 12 can then be connected to an electrical power or data source and users can connect devices on the work surface 102 to the connectors 26 and/or 28 to provide the power and/or data to a plugged in device 106, such as a laptop or other electronic device.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A desktop receptacle, comprising:
   a housing having a top surface, at least one electrical port formed therein, and defining an enclosed space configured to hold an electrical circuit; and
   a rigid support having a peripheral portion and an angled portion unitarily formed with and bent from said peripheral portion and attached to said top surface of said housing, said angled portion forming a holding angle relative to said peripheral portion that is not perpendicular.

2. The desktop receptacle according to claim 1, wherein said rigid support comprises at least one of stainless steel and aluminum.

3. The desktop receptacle according to claim 2, wherein said housing comprises a polymer.

4. The desktop receptacle according to claim 1, wherein said peripheral portion has at least two sides defining an opening therebetween, said housing being held at least partially within said opening.

5. The desktop receptacle according to claim 4, wherein said peripheral portion has four sides.

6. The desktop receptacle according to claim 1, wherein said angled portion of said rigid support is attached to said top surface of said housing by at least one of an adhesive and a fastener.

7. The desktop receptacle according to claim 1, further comprising a support bracket attached to a bottom surface of said housing, said support bracket being configured to attach to a support surface.

8. The desktop receptacle according to claim 7, wherein said support bracket is attached to said housing and is not attached to said rigid support.

9. The desktop receptacle according to claim 1, wherein said holding angle is between 20 and 60 degrees relative to said peripheral portion.

10. The desktop receptacle according to claim 1, further comprising an electrical connector inside said housing configured to connect a device to a source of at least one of electrical power and data.

11. An article of furniture, comprising:
    a work surface having an opening formed therein;
    a rigid support resting on said work surface, said rigid support having a peripheral portion resting on said work surface and an angled portion unitarily formed with and bent from said peripheral portion, said angled portion forming a holding angle relative to said peripheral portion that is not perpendicular; and
    a housing at least partially held in said opening and having a top surface and at least one electrical port formed therein, said housing defining an enclosed space configured to hold an electrical circuit, said top surface being attached to said angled portion of said rigid support.

12. The article of furniture according to claim 11, wherein said rigid support comprises at least one of stainless steel and aluminum.

13. The article of furniture according to claim 12, wherein said housing comprises a polymer.

14. The article of furniture according to claim 11, wherein said peripheral portion has at least two sides surrounding said opening.

15. The article of furniture according to claim 14, wherein said peripheral portion surrounds said opening.

16. The article of furniture according to claim 11, further comprising a support bracket attached to a bottom surface of said housing and a bottom of said work surface.

17. The article of furniture according to claim 16, wherein said support bracket is attached to said housing and is not attached to said rigid support.

18. The article of furniture according to claim 11, wherein said holding angle is between 20 and 60 degrees relative to said peripheral portion.

19. The article of furniture according to claim 11, further comprising an electrical connector inside said housing configured to connect a device to a source of at least one of electrical power and data.

20. A desktop receptacle, comprising:
    a housing having a top surface, at least one electrical port formed therein, and defining an enclosed space configured to hold an electrical circuit; and
    a rigid support having a peripheral portion and an angled portion connected to said peripheral portion by a weld and attached to said top surface of said housing, said angled portion forming a holding angle relative to said peripheral portion that is not perpendicular.

* * * * *